United States Patent [19]

Figge et al.

[11] Patent Number: 5,322,863
[45] Date of Patent: Jun. 21, 1994

[54] COATING COMPOUND, PROCESS FOR ITS PRODUCTION AS WELL AS USE THEREOF

[75] Inventors: Hans-Jürgen Figge, Münster; Holger Dartmann, Drensteinfurt, both of Fed. Rep. of Germany

[73] Assignee: BASF Lacke + Farben Aktiengesellschaft, Munster, Fed. Rep. of Germany

[21] Appl. No.: 910,256

[22] PCT Filed: Dec. 19, 1990

[86] PCT No.: PCT/EP90/02245

§ 371 Date: Aug. 7, 1992

§ 102(e) Date: Aug. 7, 1992

[87] PCT Pub. No.: WO91/10712

PCT Pub. Date: Jul. 25, 1991

[30] Foreign Application Priority Data

Jan. 18, 1990 [DE] Fed. Rep. of Germany ....... 4001251

[51] Int. Cl.$^5$ ............................................. C08L 63/02

[52] U.S. Cl. ...................................... 523/415; 525/65; 525/107; 525/438

[58] Field of Search .................. 523/415; 525/438, 65, 525/107

[56] References Cited

U.S. PATENT DOCUMENTS 4,399,241 8/1983 Ting et al. ........................... 523/400

FOREIGN PATENT DOCUMENTS

WO8801287 2/1988 World Int. Prop. O.

Primary Examiner—Melvyn I. Marquis
Assistant Examiner—David Aylward
Attorney, Agent, or Firm—Anne Gerry Sabourin

[57] ABSTRACT

The invention relates to a coating compound which comprises a binder solution containing
a) 30 to 70% by weight of a binder,
b) 2 to 30% by weight of a crosslinking agent,
c) if appropriate, 1 to 7% by weight of neutralization agent,
d) 20 to 60% by weight of solvent.

14 Claims, No Drawings

COATING COMPOUND, PROCESS FOR ITS PRODUCTION AS WELL AS USE THEREOF

The subject-matter of the present invention is a coating compound which comprises a binder solution (I) containing
 a) 30 to 70% by weight of a binder a having an acid value of 20 to 150 mg of KOH/g,
 b) 2 to 30% by weight, preferably 5 to 16% by weight, of at least one phenolic and/or amino resin and/or an isocyanate crosslinking agent as crosslinking agent b,
 c) if appropriate 1 to 7% by weight, if appropriate preferably 1 to 5% by weight, of ammonia and/or an amine as neutralization agent and
 d) 5 to 60% by weight of organic solvent,
the total weights of the components a to d being in each case 100% by weight. The binder a is prepared by
 I. reacting
  A) 20 to 80% by weight of an epoxy resin having on average more than one epoxide group per molecule with
  B) 1 to 60% by weight of a carboxyl-containing polyester resin having a number average molecular weight of 500 to 5,000
 at temperatures of 80° to 200° C., preferably of 120° to 180° C., and in the presence of catalysts, and by
 II. polymerising,
  C) 10 to 50% by weight of ethylenically unsaturated monomers, 10 to 50% by weight of the monomers containing carboxyl groups,
 in the presence of the reaction product obtained in the first process stage,
at temperatures of 60° to 200° C., preferably of 120° to 140° C., in the presence of at least 2% by weight, based on the weight of the ethylenically unsaturated monomers C, of peroxidic initiators, the total weights of the components A to C being in each case 100% by weight.

The invention further relates to the process of producing these coating compounds and to the use thereof, in particular for exterior coating of deep-drawn cans.

Packing receptacles, for example cans, tubes, drums, buckets and the like which are often known as packaging containers, generally carry on their outside a coat of paint, the purpose of which is mainly to decorate the packaging containers and to protect them from corrosion. For this reason the basic requirements of suitable coating compounds are problem-free processing and blemish-free surfaces. The blemish-free decorative coat must, however, withstand the often extreme stresses encountered in the manufacture and use of the packaging containers (folding, flange formation, deformation, sterilization etc.).

The exterior coating of packaging containers usually consists of a multicoat system comprising a basecoat as the decoration carrier, a printed coat and, if appropriate, a colorless protective coat, the so-called silver varnish. Basecoats which do not carry a colorless protective coat as the exterior finish are subject to particularly severe demands. These basecoats are also known as non-varnish exterior paints.

Non-varnish exterior paints must be highly compatible with the subsequent print, i.e. they must be capable of accepting print satisfactorily, they must possess good adhesion and good resistance to condensation. The resultant coatings must have high gloss, i.e. a degree of gloss (60° reflection angle) >80, they must possess high abrasion resistance and a smooth surface structure, i.e. one free from pits and the like.

Non-varnish exterior paints of this type are known (cf. for example Ullmanns Encyklopädie der technischen Chemie [Ullmann's Encyclopedia of Industrial Chemistry], 4th edition, 1978, Volume 15, pp. 713-714). Basic raw materials for these paints are modified alkyd resins, epoxy resins, epoxy resin esters, polyester and polyacrylate resins and usually also aminoformaldehyde or phenolformaldehyde resins or isocyanates as crosslinking components.

Due to increasing rates of production of the coating line for coating, inter alia, two-part beverage cans and similar containers and because of the high stresses acting on the applied coating compound in the so-called spin-necking process, in which the cans are subject to very severe deformation in their upper region, known exterior can paints pose considerable problems. Even given such an extremely severe deformation, it is essential to ensure that the paint film is undamaged during the spin-necking process. This requirement can only be met with coating compounds which give rise to flexible paint films. It is however furthermore essential to ensure that the resultant coatings withstand the extreme mechanical stresses encountered in can manufacture and in can filling. This means that the resultant paint films must have high abrasion resistance and a correspondingly high degree of hardness, especially scratch hardness. It is true that isocyanate-crosslinked systems meet the requirement for good flexibility and at the same time a good degree of hardness, but these systems suffer the drawback of a marked tendency to yellowing in pigmented white paints.

A further drawback of the known coating compounds is the fact that they represent conventional, i.e. organically dissolved systems. Because of the prescribed application viscosities, these coating compounds generally contain between 30 and 50% by weight of an organic solvent, which causes severe pollution of the environment by solvent emission during the baking of the coatings. Accordingly increasingly intense efforts are being made to produce aqueous systems.

Hydrolysis-stable aqueous paints especially those for interior can coating, are known from U.S. Pat. No. 4,247,439 and European Patents 6334 and 6336; these paints are obtained from esterification products of epoxy resins with carboxyl-functional polyacrylate resins. Moreover, hydrolysis-stable aqueous interior protective can paints are known from U.S. Pat. No. 4,212,781 and U.S. Pat. No. 4,308,185.

U.S. Pat. No. 4,212,781 discloses resin mixtures which are dispersible in an aqueous basic medium and are obtained by copolymerization of ethylenically unsaturated monomers, some of which contain carboxyl groups, in the presence of an aliphatic or aromatic 1,2-diepoxy resin using at least 3% by weight, based on the monomer weight, of benzoyl peroxide or equivalent initiators. The resin mixtures known from U.S. Pat. No. 4,212,781 can be crosslinked with amino resins. They are particularly suitable for spray-coating of beverage cans.

Water-thinnable compositions for the coating of metal cans are known from DE-A 3,446,178, the polymer present in the composition consisting of a reaction product of acrylic monomers, a high-molecular epoxy resin, a phenol-formaldehyde resin and a free-radical initiator.

Prior art aqueous systems for exterior coating of two-part beverage cans are used principally on aluminum substrates. They have the drawback of providing inadequate surface protection on problematic substrates, such as, for example, drawn and ironed beverage cans made of tinplate.

Finally, coating compounds according to the preamble of claim 1 are known from the international patent application bearing the international publication number WO 88/01287. The coating compounds described therein are used mainly for interior coating of cans and are applied by electrocoating or spraying. According to the present invention the resistance to pasteurization and the flexibility of the resultant coating should be further improved in comparison with the WO 88/01287 systems.

The object of the present invention is thus to provide a coating compound which is suitable for exterior coating of packaging containers, in particular of deep-drawn beverage cans, and which should be available for use both in conventional form and as aqueous binder dispersions. The coatings produced from these coating compounds should possess, in addition to satisfactory hardness, high flexibility in order to withstand the mechanical stresses encountered in can manufacture and can filling. Furthermore, the coatings should possess a smooth surface, a high degree of gloss, good print acceptability and in particular good adhesion of the coating to the various can materials such as, for example, tinplate, tin-free steel and surface-treated steel. In addition, the coating compounds under discussion should be capable of application using customary equipment.

In the case of the aqueous coating compounds the binder dispersions should have a long shelf life. Furthermore aqueous coating compounds of this type should achieve at least the level of properties of known conventional exterior paints, viz. hardness, flexibility, adhesion and resistance to pasteurization and solvents.

This object is achieved according to the invention by coating compounds of the type referred to at the outset, wherein 1) the epoxy resin A has a number average molecular weight of at least 850,
2) the polyester resin B has an acid value of 2 to <30 mg of KOH/g and
3) the epoxy resin A is reacted with the polyester resin B in such a way that at least 50%, preferably 50 to <80% of the oxirane rings initially present are opened.

In addition, the present invention relates to a process for the production of the coating compounds as well as the use of the coating compounds for coating of packaging containers, in particular for exterior coating of deep-drawn cans.

Epoxy resins based on bisphenol A having a number average molecular weight of 850 to 20,000 are preferably used as the component A. Examples of suitable epoxy resins are glycidyl polyethers which are marketed, for example, under the trade names Epikote 1001, 1004, 1007, 1008, 1055 and 1009. The epoxy resins advantageously have a number average molecular weight of 1,200 to 3,000.

Polyesters having number average molecular weights of 500 to 5,000, preferably 1,000 to 3,000, and an acid value of 2 to <30 mg of KOH/g, preferably 10 to 20 mg of KOH/g, are used as the component B.

The preparation of the polyesters used as the component B is carried out under conditions known to a person skilled in the art for polyesterification reactions. They are known polycondensates obtained from aromatic and/or aliphatic dicarboxylic acids, aromatic dicarboxylic anhydrides, aromatic tricarboxylic anhydrides, aromatic tetracarboxylic anhydrides and dianhydrides as well as aliphatic and cycloaliphatic monools, diols and triols. Preferred starting compounds for the polyesters (component B) are terephthalic acid, isophthalic acid, dimethyl terephthalate, o-phthalic acid, o-phthalic anhydride, trimellitic acid, trimellitic anhydride, adipic acid, sebacic acid, aliphatic monools having 4 to 20 carbon atoms, 2,2-dimethyl-1,3-propanediol, ethylene glycol, diethylene glycol, 1,6-hexanediol, trimethylolpropane, glycerol and pentaerythritol.

The ethylenically unsaturated monomers used as the component C consist of 10 to 50% by weight of carboxyl-containing monomers. Examples of carboxyl-containing monomers are acrylic acid and methacrylic acid. In addition it is possible to use as the monomers non-functionalized monomers such as, for example, styrene, vinyltoluene and α-methylstyrene, preferably styrene.

(Meth)acrylic acid esters having 1 to 20 carbon atoms in the alcohol radical are preferably used as a third class of monomers, hydroxyl-functional monomers being likewise suitable.

Suitable examples are ethyl acrylate, propyl acrylate, isopropyl acrylate, butyl acrylate, isobutyl acrylate, t-butyl acrylate, pentyl acrylate, decyl acrylate, lauryl acrylate, methyl methacrylate, butyl methacrylate, isobutyl methacrylate, hexyl methacrylate, 2-ethylhexyl methacrylate, octyl methacrylate, nonyl methacrylate, as well as hydroxyethyl acrylate, hydroxypropyl acrylate, hydroxybutyl acrylate, hydroxyethyl methacrylate, hydroxypropyl methacrylate and hydroxybutyl methacrylate.

The ethylenically unsaturated monomers of the component C preferably consist of x) 10 to 50% by weight, preferably 20 to 40% by weight, of carboxyl-containing monomers,
y) 0 to 50% by weight, preferably 20 to 40% by weight, of non-functionalized monomers and
z) 5 to 60% by weight, preferably 10 to 50% by weight, of (meth)acrylic acid esters having 1 to 20 carbon atoms in the alcohol radical which are, if appropriate, hydroxy-functional, the total of x, y and z being 100% by weight.

The component C has an acid value in the region of 30 to 150, preferably in the region of 50 to 100 mg of KOH/g.

The binder a preferably contains 20 to 60% by weight of A, 10 to 40% by weight of B and 15 to 40% by weight of C, the total weights of the components A, B and C being 100% by weight.

The binder a prepared from the components A, B and C has in general an acid value which is high enough to produce stable aqueous dispersions. The acid value of this binder a is preferably between 20 and 150 mg of KOH/g, particularly preferably between 40 and 100 mg of KOH/g.

To initiate the polymerization of the components x, y and z at least 2% by weight, preferably at least 2.6% by weight and particularly preferably at least 3% by weight, based on the total weight of the ethylenically unsaturated monomers, of dibenzoyl peroxide or of a free-radical-initiating equivalent at the application temperature are used. Initiators furnishing benzoyloxy free radicals and/or phenyl free radicals are used for preference.

Examples of suitable initiators are dibenzoyl peroxide, t-butylbenzoyl peroxide, tert-butyl peroctoate, cumene hydroperoxide and methyl ethyl ketone peroxide, di-tert-butyl peroxide, tert-butylperoxy 2-ethylhexanoate, tert-butylperoxy isononanoate, tert-butylperoxy isobutyrate and tert-amylperoxy 2-ethylhexanoate.

According to the present invention any phenolic resin may be used as the component b, provided it possesses the methylol functionality required for the reactivity. Preferred phenolic resins are reaction products of phenol prepared under alkaline conditions, substituted phenols and bisphenol A with formaldehyde. Under these conditions the methylol group is linked with the aromatic ring either in the ortho or para position.

Phenolic resins of the resol type based on bisphenol A and containing more than one methylol group per phenyl ring are preferred.

Typical amino resins are melamine-formaldehyde, benzoguanamine-formaldehyde and urea-formaldehyde resins. These resins are preferably used etherified with lower alcohols, mainly methanol and/or butanol. Examples of suitable amino resins are those commercially available under the brand names Cymel, Luwipal, Maprenal and Beetle. An example of a suitable amino resin is hexamethoxymethylmelamine.

Other aldehydes besides formaldehyde may of course also be used for the condensation.

Furthermore isocyanate crosslinking agents which can be used either on their own or in conjunction with the phenolic and/or amino resin are suitable as the component b. Examples of such isocyanate crosslinking agents are blocked isocyanates, preferably of the hexamethylene diisocyanate or toluylene diisocyanate type which are commercially available under the brand name Desmodur.

When the binder a described is used for the preparation of an aqueous coating compound, 1 to 7% by weight, preferably 1 to 5% by weight, in each case based on the total weight of the components a to d of the binder solution, of ammonia and/or an amine are used as the neutralization agent (component c). The preferred neutralization agents c are triethylamine and/or dimethylethanolamine.

Examples of organic solvents which are suitable to use as the component d, are monoalcohols having 3 to 18 carbon atoms, such as, for example, butanol, isobutanol, propanol and isopropanol; glycol ethers such as, for example, butyl glycol, butyl diglycol, hexyl glycol and propylene glycol.

Solvents which are preferably used as the solvents, at least in part, are those which are at the same time suitable to be used as cosolvents for the aqueous dispersion, for example butanol, butyl glycol and butyl diglycol. The solvents are usually used in amounts of 5 to 60% by weight.

Besides the binder solution described which is usually used in amounts of 5 to 60% by weight, preferably of 15 to 50% by weight, in each case based on the total weight of the coating compound, the coating compounds may also contain, if appropriate, pigments and/or fillers, other auxiliaries and additives, solvents and, if appropriate, water, in each case in the usual amounts.

Pigments and/or fillers are preferably used in amounts of 25 to 35% by weight, based on the total weight of the coating compound. Examples of suitable pigments are titanium dioxide, for example that available under the trade names Titanium Rutile RN 59, RTC 60, R 900 and RDI-S.

Suitable fillers are barium sulfate, such as, for example, the commercial products Blancfix micro, Blancfix F; silicon dioxide, for example the commercial product quartz sand SF 600; potassium carbonate and talc.

The coating compounds preferably also contain 0.01 to 5.0% by weight, based on the total weight of the coating compound, of other auxiliaries and additives, for example lubricants such as waxes, plasticizers, stabilizers, wetting agents, dispersants, catalysts, surface-active additives, and then either on their own or in admixture.

The solvent content of the coating compounds according to the invention preferably is in the case of conventional, i.e. solvent-borne, coating compounds, 30 to 50% by weight, based on the total weight of the coating compound. On the other hand, aqueous coating compounds contain preferably 10 to 25% by weight of organic solvents and preferably 20 to 40% by weight of water, in each case based on the total weight of the coating compound.

The coating compounds according to the invention described above are prepared by the following process: the epoxy resin A is first reacted at 80° to 200° C., preferably at 120° to 180° C., in the presence of catalysts, with the polyester component B in such a manner that at least 50%, preferably 50 to <80% of the oxirane rings initially present are opened. Subsequently the component C is radically polymerized at 60° to 200° C., preferably at 120° to 140° C., in the presence of the reaction product obtained in the first stage of the process, using at least 2% by weight, based on the weight of the ethylenically unsaturated monomers, of peroxidic initiators furnishing preferably benzoyloxy and/or phenyl free radicals. If appropriate, the resultant product is neutralized in a third stage of the process using the component c, the organic solvent d, the crosslinking agent b and, if appropriate, further customary additives are admixed and, if appropriate, the coating compound is dispersed in water.

The reaction of the epoxy resin with the polyester resins taking place in the first stage of the process is catalyzed using amines, preferably tertiary amines. The reaction is performed in such a manner that at least 50%, preferably 50 to <80%, of the oxirane rings are converted to $\beta$-hydroxyester or $\beta$-hydroxyether groups.

In the second stage of the process the ethylenically unsaturated monomers of the component C, some of which contain carboxyl groups, undergo free radical polymerization reaction in the presence of the epoxide-polyester adduct produced in the first stage of the process. The free radical polymerization is initiated by at least 2% by weight, based on the total weight of the monomers, of peroxidic initiators preferably furnishing benzoyloxy and/or phenyl free radicals. At least 2.6% by weight, particularly preferably at least 3% by weight, of initiator are used. Satisfactory results are of course also achieved using high proportions of initiators, for example 8 to 10% by weight, but this is not recommended for reasons of economy. If the polymerization is carried out in the presence of relatively low concentrations of the initiator, for example at less than 3% by weight, based on the monomer weight, a high degree of neutralization is required in order to obtain a stable dispersion.

The peroxidic initiators mainly used are those which break down with the formation of benzoyloxy and/or phenyl free radicals. It is of course also possible to use other initiators, as long as they lead to equivalent conditions.

Dibenzoyl peroxide and/or tert-butyl perbenzoate are preferably used as initiators. Other possible initiators are tert-butyl peroctoate, cumene hydroperoxide, di-tert-butyl peroxide, tert-butylperoxy 2-ethylhexanoate, tert-butylperoxy isononanoate, tert-butylperoxy isobutyrate, tert-amylperoxy 2-ethylhexanoate and methyl ethyl ketone peroxide.

By metering the addition of the initiator and/or by extending the initiator addition time the amount of residual monomer is advantageously kept to less than 0.4%, based on the total of a to d.

Where the binder described is used for the preparation of an aqueous coating compound, the crosslinking agent b is added with mixing to the resultant polymer or is precondensed with the binder in a third stage of the process following the free radical polymerization. The resultant binder is at least partially neutralized by the addition of ammonia and/or a mines. The ammonia and/or the Mines are added in an amount that is sufficient to render the coating compound water-dispersible. The amount of the component b is generally about 1 to 7% by weight, preferably 1 to 5% by weight, based on the total weight of the sum of the components a to d.

In order to produce a film with a satisfactory flow-out characteristic, the required cosolvents and other customary auxiliaries and additives and, if appropriate, pigments and fillers, are then added with mixing to the system and the coating compound is dispersed in water.

The coating compounds according to the invention cure at an object temperature range of 150° to 400° C. during a period from 2 seconds to 10 minutes. They can be applied by rolling, blade coating, brushing, spraying, flow coating or dipping using the usual equipment, the film being subsequently cured to form a strongly adhering coating. In the case of exterior can paints the coating compounds are preferably applied by rolling; in the case of internal can paints they are preferably applied by spraying. The aqueous coating compounds according to the invention may also be applied by anodic electrocoating. To this end the components to be coated are immersed in an aqueous bath based on the above-described coating compound according to the invention and are connected as anode. A film is deposited on the cans using direct current, the substrate is removed from the bath and the film is cured by baking.

The coating compounds are preferably applied as a one-coat coating generally with a dry film thickness of 5 to 25 μm.

The coating compounds according to the invention are suitable for the coating of packaging containers, in particular for exterior coating of cans and the like. They can, however, also be used for internal coating of cans and the like. The packaging containers may be of a great variety of materials and shapes. Suitable materials are in particular tin-free steel, tinplate and various alloys of iron which may, if desired, be treated with a passivation layer based on nickel, chromium and zinc compounds. The packaging containers may be coated, for example, in the form of two-part cans, i.e. body and lid, as 3-part cans and as 2-part drawn and ironed or otherwise deep-drawn cans, for example cans for beverages and foodstuffs.

The advantages of the process according to the invention lie in the fact that it offers many possibilities for controlling the acid value by varying the polyester or the polymer. In this way it is possible to optimize the application properties (for example high tolerance for temperatures during curing) and adhesion to specific metal surfaces. The polymerization process ensures that the components are compatible with one another and do not interfere with the residual monomers (residual monomer content less than 0.4% based on the total of a to d).

In addition the coatings obtained from the coating compounds according to the invention are distinguished by good hardness and, at the same time, by good flexibility, and the coatings have a smooth surface (freedom from pores), a high degree of gloss, good print acceptability and in particular good adhesion to the various can materials, in particular to surface-treated steel substrates.

In addition the aqueous coating compounds according to the invention possess a long shelf life and they attain at least the level of properties of known conventional exterior paints in respect of hardness, flexibility, adhesion and resistance to pasteurization and solvents.

In the text below the invention is elucidated in greater detail by means of examples. All parts and percentages are by weights, unless expressly stated otherwise.

1. Preparation of a polyester resin (component B)
   1.1 674 g of terephthalic acid, 112 g of trimellitic anhydride, 847 g of adipic acid, 19 g of pentaerythritol, 1,215 g of diethylene glycol, and 8 g of esterification catalyst are weighed into a four-necked flask fitted with a stirrer, thermometer and water separator, and the condensation is allowed to proceed at 230° C. to an acid value of 15 mg of KOH/g. The polyester melt is finally dissolved in butyl glycol to form a 75% solution.
   1.2 572 g of terephthalic acid, 220 g of trimellitic anhydride, 838 g of adipic acid, 19 g of pentaerythritol, 1,202 g of diethylene glycol and 8 g of an esterification catalyst are weighed into a four-necked flask fitted with a stirrer, the thermometer and water separator, and the condensation is allowed to proceed at 230° C. to an acid value of 30 mg of KOH/g. The polyester melt is then dissolved in butyl glycol to form a 75% solution.
2. Preparation of an epoxide ester resin
   2.1 A mixture of 918 g of an epoxy resin based on bisphenol A having an epoxide equivalent weight of 3,000, 306 g of butyl glycol, 2 g of N,N-dimethylbenzylamine and 820 g of the polyester resin from 1.1 are heated at 160° C. in a four-necked flask fitted with a stirrer, thermometer and reflux condenser until the acid value has dropped below 2 mg of KOH/g. A 30% solution of the epoxide ester prepared in this manner in butyl glycol has a viscosity of 140 mPas at 23° C.
   2.2 A mixture of 918 g of an epoxy resin based on bisphenol A having an epoxide equivalent weight of 3,000, 300 g of butyl glycol, 2 g of N,N-dimethylbenzylamine and 816 g of the polyester resin 1.2 are heated at 160° C. in a four-necked flask fitted with a stirrer, thermometer and reflux condenser until the acid value has dropped below 2 mg of KOH/g. A 30% solution of the epoxide ester prepared in this manner in butyl glycol has a viscosity of 150 mPas at 23° C.
   2.3 A mixture of 772 g of an epoxy resin based on bisphenol A having an epoxide equivalent weight of 940, 254 g of butyl glycol, 2 g of N,N-dimethylbenzylamine and 1,023 g of the polyester resin 1.1 are heated at 160° C. in a four-necked flask fitted with a stirrer, thermometer and reflux condenser until the acid value has dropped below 2 mg of KOH/g. A 30% solution of the epoxide ester prepared in this manner in butyl glycol has a viscosity of 50 mPas at 23° C.

3. Preparation of a copolymer 3.1 2,045 g of the epoxide ester 2.1 are introduced into a four-necked flask fitted with a stirrer, thermometer, reflux condenser and two feed vessels. A mixture of 169 g of acrylic acid, 166 g of styrene and 327 g of butyl acrylate is added at 120° C. from the first feed vessel, while a solution of 25 g of (75%) dibenzoyl peroxide in 122 g of methyl ethyl ketone is added at the same time from the second feed vessel. The monomers are added over 2 hours, the initiator over 2.5 hours. At the end of the polymerization the solids content is adjusted to 50% with butyl glycol.

3.2 2,036 g of the epoxide ester 2.2 are introduced into a four-necked flask fitted with a stirrer, thermometer, reflux condenser and two feed vessels. A mixture of 163 g of acrylic acid, 166 g of styrene and 327 g of butyl acrylate is added at 120° C. from the first feed vessel, while a solution of 25 g of (75%) dibenzoyl peroxide in 122 g of methyl ethyl ketone is added at the same time from the second feed vessel. The monomers are added over 2 hours, the initiator over 2.5 hours. At the end of the polymerization the solids content is adjusted to 50% with butyl glycol.

3.3 2,051 g of the epoxide ester 2.3 are introduced into a four-necked flask fitted with a stirrer, thermometer, reflux condenser and two feed vessels. A mixture of 163 g of acrylic acid, 166 g of styrene and 327 g of butyl acrylate is added at 120° C. from the first feed vessel, while a solution of 25 g of (75%) dibenzoyl peroxide in 122 g of methyl ethyl ketone is added at the same time from the second feed vessel. The monomers are added over 2 hours, the initiator over 2.5 hours. At the end of the polymerization the solids content is adjusted to 50% with butyl glycol.

4. Preparation of a polyester for Comparison Example 2

4.1 In a four-necked flask fitted with a stirrer, thermometer, and a packed column a mixture of 11.7 parts of 1,6-hexanediol, 10.4 parts of neopentyl glycol, 3.4 parts of trimethylolpropane, 5.7 parts of a commercial dimeric fatty acid (acid value approx. 190 mg of KOH/g, viscosity at 25° C. $8.10^{-3}$-$9.10^{-3}$ m$^2$/s, proportion of dimer about 80% proportion of trimer about 20%) and 31.6 parts of isophthalic acid is esterified under the usual polycondensation conditions in the presence of 0.04 parts of an esterification catalyst until an acid value of <10 mg of KOH/g and a viscosity of 90-95 seconds efflux time from a DIN 4 mm cup (50% solution in ethyl glycol acetate) at 23° C. are reached. The solids content of the resin is then adjusted to 60% with Solvesso ® 150 and butyl glycol (4:1).

EXAMPLE 1

To prepare a coating compound 1, 24 parts of the copolymer 3.1 are first ground with 27 parts of titanium dioxide of the futile type; further 5 parts of the copolymer 3.1, 7 parts of a commercial benzoguanamine resin (83% solution in butanol, etherification alcohol n-butanol, for example Luwipal ® B 017 from BASF AG, Ludwigshafen), 8 parts of a commercial epoxy resin-modified alkyd resin (70% solution in butyl glycol/methoxypropanol 3:1, acid value 40-60 mg of KOH/g; commercial product Resydrol ® WE 162 from Hoechst AG) and 0.2 parts of a polytetrafluoroethylene wax (melting point 100° C., for example commercial product Lanco TF 1780 from Langer & Co) are added and the mixture is neutralized with 2 parts of dimethylethanolamine. The mixture is then dispersed into 40 parts of demineralized water and the viscosity of the dispersion is then adjusted to an efflux time of 60 seconds in a DIN 4 nun flow cup at 23° C. with demineralized water.

An uncoated, two-part beverage can made of tinplate (E 2.0/2.0 ) is roller-coated with coating compound 1. The coating is baked twice for 20 seconds at 190° C. and once for 5 minutes at 230° C. A coating having a dry film thickness of 11 μm is obtained. The test results on the resultant coating are listed in Table 1.

COMPARISON EXAMPLE 1

A coating compound C1 is prepared in the same manner as that in Example 1 by first grinding 24 parts of the copolymer 3.2 with 27 parts of titanium dioxide of the futile type; further 5 parts of the copolymer 3.2, 7 parts of a commercial benzoguanamine resin (83% solution in butanol, etherification alcohol n-butanol, for example Luwipal ® B 017 from BASF AG, Ludwigshafen), 8 parts of a commercial epoxy resin-modified alkyd resin (70% solution in butyl glycol/methoxypropanol 3:1, acid value 40-60 mg of KOH/g; for example Resydrol ® WE 162 from Hoechst AG) and 0.2 part of a polytetrafluoroethylene wax (melting point 100° C, for example Lanco TF 1780 from Langer & Co.) are added and the mixture is neutralized with 2 parts of dimethylethanolamine. The mixture is then dispersed into 40 parts of demineralized water and the viscosity of the dispersion is adjusted to an efflux time of 60 seconds in a DIN 4 mm flow cup at 23° C. with demineralized water.

The application and curing of the coating compound C1 and the testing of the resultant coating is carried out in the same manner as in Example 1. The test results are likewise listed in Table 1.

EXAMPLE 2

To prepare coating compound 2, 24 parts of the copolymer 3.1 are first ground with 27 parts of titanium dioxide of the futile type; further 5 parts of the copolymer 3.1, 7 parts of a commercial benzoguanamine resin (e.g. Luwipal B 017 from BASF AG, etherified with n-butanol, 83% solution in butanol), 8 parts of a commercial epoxy resin-modified alkyd resin (for example Resydrol WE 162 from Hoechst AG, 70% solution in butyl glycol/methoxypropanol 3:1, acid value 40-60 mg of KOH/g) and 0.2 part of a polytetrafluoroethylene wax (for example Lanco TF 1780 from Langer & Co., melting point 100° C.) are added. The mixture is then dissolved in 40 parts of butyl diglycol acetate and its viscosity is adjusted to an efflux time of 60 seconds in a DIN 4 mm flow cup at 23° C.

The application and curing of the coating compound 2 and the testing of the resultant coating is carried out in the same manner as in Example 1. The test results are likewise listed in Table 1.

EXAMPLE 3

To prepare coating compound 3, 25 parts of the copolymer 3.3 are first ground with 30 parts of titanium dioxide of the futile type; further 15 parts of copolymer 3.3, 1 part of a commercial urea resin (for example Dynomin UM 15 from Dyno Cyanamid, 96% solution in methanol/water), 7 parts of a commercial benzoguanamine resin (83% solution in butanol, etherification alcohol n-butanol, for example Luwipal® B 017 from BASF AG, Ludwigshafen), 3.5 parts of a commercial epoxy resin-modified alkyd resin (70% solution in butyl glycol/methoxypropanol 3:1, acid value 40–60 mg of KOH/g, for example Resydrol® WE 162 from Hoechst AG) and 0.2 part of a polytetrafluoroethylene wax (melting point 100° C., for example Lanco TF 1780 from Langer & Co.) are added and the mixture is neutralized with 1.5 parts of dimethylethanolamine. The mixture is then dispersed into 40 parts of demineralized water and its viscosity is then adjusted to an efflux time of 60 seconds in a DIN 4 mm flow cup at 23° C.

The application and curing of the coating compound 3 and the testing of the resultant coating is carried out in the same manner as in Example 1. The test results are likewise listed in Table 1.

COMPARISON EXAMPLE 2

For comparison, an unpainted, two-part beverage can of tinplate (E 2.0/2.0) is coated with a customarily used solvent-borne exterior paint C2, this is prepared by grinding 20 parts of a commercial acrylated polyester (for example Uralac S3152 from DSM, 60% solution in butyl glycol/Solvesso 150 4:1, acid value <50 mg of KOH/g) are ground with 27 parts of titanium dioxide of the futile type. The formulation of the paint is then completed by adding 8 parts of butyl glycol, further 4 parts of the commercial acrylated polyester, 3 parts of the polyester resin 4.1, 7.5 parts of a commercial epoxy resin-modified alkyd resin (for example Resydrol WE 162 from Hoechst AG, 70% solution in butyl glycol/methoxypropanol 3:1, acid value 40–60 mg of KOH/g), 7.5 parts of a commercial bisphenol A epichlorohydrin epoxy resin (epoxide equivalent weight of 450–500), 6.5 parts of a commercial benzoguanamine resin (83% solution in butanol, as the etherification alcohol, for example Luwipal® B 017 from BASF AG), 4.2 parts of a commercial blocked isocyanate crosslinking agent (for example Desmodur BL 3175 from Bayer AG), 2 parts of a commercial polyethylene wax as a slip additive (for example PE-1500 from Langer & Co.) and 10 parts of butyl diglycol acetate.

The application and curing of the coating compound C2 as well as the testing of the resultant coating is carried out in the same manner as in Example 1. The test results are listed in Table 1.

TABLE 1

| | Test results | | | | |
|---|---|---|---|---|---|
| | 1 | V1 | 2 | 3 | V2 |
| 206 spin-necking drawability[1] | ++ | + | ++ | ++ | ++ |
| Print acceptability[2] | ++ | ++ | ++ | ++ | ++ |
| MEK[3] according to Coater | 40 | 10 | 40 | 20 | 40 |
| Decorator | 100 | 50 | 100 | 40 | 100 |
| IBO | >150 | >100 | >150 | >100 | 10 |
| Resistance to pasteurization[4] | ++ | − | ++ | ++ | ++ |
| Resistance to yellowing[5] | ++ | ++ | ++ | ++ | −− |
| Flexibility[6] | ++ | +− | ++ | ++ | + |
| Adhesion[7] | Gt 0 | Gt 0 | Gt 0 | Gt 0 | Gt 0 |
| Shelf life of the dispersion at 20° C.) | >6 mths. | >6 mths. | — | >6 mths. | — |

Notes on Table 1:
[1] The 206 spin-necking drawability indicates whether the coating after the 2nd drying is damaged by mechanical deformation in the metal box spin-necker diameter 206 (++ = no damage; −− = abrasion).
[2] Print acceptability was assessed visually. The test consisted of assessing whether the printing ink could form a closed, glossy film (++ = best rating; −− = worst rating).
[3] In the MEK test a cotton wad saturated with methyl ethyl ketone is moved in regular double strokes across the film until the substrate becomes visible. The applied force is about 20 N. The MEK test is carried out directly after the white paint (Coater), printing ink (Decorator) and interior paint (IBO) has dried.
[4] Resistance to pasteurization is assessed by pasteurizing the coated can for 30 minutes at 85° C. with a 0.1% solution of $Na_2CO_3$. The film is then subjected to a Tesa fil peel-off test and a water absorption test (best rating = ++; worst rating = −−).
[5] Resistance to yellowing is assessed by visually comparing the baked can with a can which has only been coated with a coat of white paint and dried (best rating = ++; worst rating = −−).
[6] Flexibility is assessed by Erichsen cupping (1st and 2nd pass) (best rating = ++; worst rating = −−).
[7] Ahesion is assessed by a crosshatch test followed by a Tesa film peel-off (best rating = Gt 0; worst rating = Gt 5).

SUMMARY OF THE TEST RESULTS

A comparison of Examples 1, 2 and 3 and of Comparison Examples 1 and 2 indicates that the coating compounds in Examples 1 to 3 have outstanding resistance and very good mechanical properties, in particular excellent spin-necking drawability on deep-drawn cans made of tin-plated steel. In addition print acceptability is comparable with known exterior paints. The resistance to pasteurization of both the solvent-borne and aqueous coating compounds corresponds to the high requirements demanded for conventional solvent-borne packaging container paints.

We claim:
1. A binder solution (I) for a coating composition comprising
    a) 30 to 70% by weight of a binder (a) having an acid value of 20 to 150 mg of KOH/g,
    b) 2 to 30% by weight, preferably 5 to 16% by weight of at least one phenolic and/or amino resin and or an isocyanate crosslinking agent as crosslinking agent (b),
    c) if appropriate 1 to 7% by weight of ammonia and/or an amine as neutralization agent and
    d) 5 to 60% by weight of organic solvent, the total weights of the components (a) to (d) being in each case 100% by weight, the binder (a) being prepared by

I. reacting
   A) 20 to 80% by weight of an epoxy resin having on average more than one epoxide group per molecular with
   B) 1 to 60% by weight of a carboxy-comprising polyester resin having a number average molecular weight of 500 to 5000 at temperatures of 80° to 200° C. and in the presence of catalysts, and by
II. polymerising
   C) 10 to 50% by weight of ethylenically unsaturated monomers, 10 to 50% by weight of the monomers comprising carboxyl groups, in the presence of the reaction product obtained in the first process stage, at temperatures of 60° to 200° C. in the presence of at least 2% by weight, based on the weight of the ethylenically unsaturated monomers (C), of peroxide initiators, the total weight of the components (A) to (C) being in each case 100% by weight,
   wherein
   1) the epoxy resin (A) has a number average molecular weight of at least 850,
   2) the polyester resin (B) has an acid value of 2 to 30 mg of KOH/g and
   3) the epoxy resin (A) is reacted with the polyester resin (B) in such a way that at least 50% and less than 80% of the oxirane rings initially present are opened.

2. The binder solution as claimed in claim 1, wherein the epoxy resin (A) is based on bisphenol A.

3. The binder solution as claimed in claim 2, wherein the epoxy resin has a number average molecular weight of 1,200 to 3,000.

4. The binder solution as claimed in claim 1, wherein the polyester resin B has a number average molecular weight of 1,000 to 3,000 and an acid value of 10 to 20 mg of KOH/g.

5. The coating compound as claimed in claim 1, wherein the ethylenically unsaturated monomers comprising
   x) 10 to 50% by weight of carboxy-comprising monomers,
   Y) 0 to 50% by weight of non-functionalized monomer and
   z) 5 to 60% by weight of (meth)acrylic acid esters having 1 to 20 carbon atoms in the alcohol radical, which are, if appropriate, at least in part hydroxy-functional, the total weights of the components (x) to (z) being in each case 100% by weight.

6. The binder solution as claimed in claim 1, wherein the binder (a) is obtained by
   A) 20 to 60% by weight of the epoxy resin (A),
   B) 10 to 40% by weight of the polyester resin (B) and
   C) 15 to 40% by weight of the monomers (C), the total weights of the components (A) to (C) being in each case 100% by weight.

7. A process for the production of a binder solution (I) comprising
   a) 30 to 70% by weight of a binder (a) having an acid value of 20 to 150 mg of KOH/g,
   b) 2 to 30% by weight, preferably 5 to 16% by weight of at least one phenolic and/or amino resin and/or an isocyanate crosslinking agent (b),
   c) if appropriate 1 to 7% by weight, if appropriate preferably 1 to 5% by weight of ammonia and/or an amine as neutralization agent and
   d) 5 to 60% by weight of organic solvent, the total weights of the components (a) to (d) being in each case 100% by weight, the binder (a) being prepared by I. reacting
   A) 20 to 80% be weight of an epoxy resin having on average more than one epoxide group per molecular with
   B) 1 to 60% by weight of a carboxyl-comprising polyester resin having a number average molecular weight of 500 to 5000 at temperatures of 80° to 200° C., and in the presence of catalysts, and by
II. polymerising
   C) 10 to 50% by weight of ethylenically unsaturated monomers, 10 to 50% by weight of the monomers comprising carboxyl groups, in the presence of the reaction product obtained in the first process stage, at temperatures of 60° to 200° C., in the presence of at least 2% by weight, based on the weight of the ethylenically unsaturated monomers (C), of peroxidic initiators, the total weight of the components (A) to (C) being in each case 100% by weight,
3) if appropriate, the resultant binder (a) is at least partially neutralized with the component (c),
4) the crosslinking agent (b), organic solvent (d) and any other additives are admixed and
5) the resulting material, if appropriate, is dispersed in water,
wherein
1) the epoxy resin (A) has a number average molecular weight of at least 850,
2) the polyester resin (B) has an acid value of 2 to 30 mg of KOH/g and
3) the epoxy resin (A) is reacted with the polyester resin (B) in such a way that at least 50% of the oxirane rings initially present are opened.

8. The process as claimed in claim 7, wherein the resultant binder (a) is first precondensed with the crosslinking agent (b), is then at least partially neutralized, if appropriate, with the component (c), the solvent (d) and, if appropriate, further customary additives are admixed and, if appropriate, the coating compound is dispersed in water.

9. The process as claimed in claim 7, wherein less than 0.4% by weight, based on the total of (a) to (d), of residual monomers is present after the radical polymerization.

10. The process as claimed in claim 7, wherein the component (d) is used as solvent of the etherification of the components (A) and (B) carried out as the first process stage.

11. The process as claimed in claim 7, wherein the epoxy resin (A) is based on bisphenol A.

12. The process as claimed in claim 7, wherein the epoxy resin has a number average molecular weight of 1,200 to 3,000.

13. The process as claimed in claim 7, wherein the polyester resin (B) has a number average molecular weight of 1,000 to 3,000 and an acid value of 10 to 20 mg of KOH/g.

14. The process as claimed in claim 7, wherein the ethylenically unsaturated monomers (C) comprise
   x) 10 to 50% by weight of carboxy-comprising monomers,
   Y) 0 to 50% by weight of non-functionalized monomer and
   z) 5 to 60% by weight, preferably 10 to 50% by weight of (meth)acylic acid esters having 1 to 20 carbon atoms in the alcohol radical, which are hydroxy-functional, if appropriate, the total weights of the components (x) to (z) being in each case 100% by weight.

* * * * *